Patented Jan. 21, 1941

2,229,051

UNITED STATES PATENT OFFICE 2,229,051

GUM ARABIC SOLUTIONS AND METHOD OF MAKING SAME

Edward Frank Dell, Park Ridge, Ill., assignor to Davidson Manufacturing Company, a corporation of Wisconsin No Drawing. Application October 29, 1937, Serial No. 171,807

16 Claims. (Cl. 41—41.5)

In large lithographic concerns, the gum arabic solution used in etching solutions and for preserving lithographic plates is made up fresh every few days, if not every day, and no particular problem is involved in keeping the gum arabic solution sweet as long as the customary preservatives, such as carbolic acid, formaline, and the like are used, but these preservatives are unable to keep the solution sweet for more than four or five days.

In smaller concerns, and particularly in business offices where relatively small lithographic presses are used, it is desirable to have a gum arabic solution which will remain sweet over a long period of time so that it will be unnecessary to make up fresh solutions every few days, or whenever the press is to be used. Although crystals of thymol have been used as a preservative in the gum solutions, some decomposition does take place because of the concentration of the germicidal agent within a relatively small area, and the remoteness of the thymol crystal from a large portion of the solution. As a result; the solution loses some of its freshness, and it is a well known fact that as a gum arabic solution begins to sour, it takes on the property of a counter-etch, i. e. it makes the plate grease receptive in the non-printing areas whereas those areas should be kept grease repellant. The function of a sweet gum arabic solution is to maintain the desired grease repelling property in the non-printing portion of the plate.

I have found that I can maintain gum arabic solution sweet over a long period of time without any decomposition whatsoever, at least so far as observed results are concerned, by dissolving a suitable germicidal agent, such as thymol, hexylresorcinal, or the like, in a solvent which in itself is non-injurious to the grease receptive or image portion of the plate, and then mixing thymol solution with the gum arabic solution in a particular way.

I have found that anhydrous alcohol is an excellent solvent for this purpose, although I do not intend to be limited to this material for my solvent. Ordinary alcohol is also suitable.

In making the gum arabic solution, I prefer to take 100 grains of thymol and dissolve it in one ounce of anhydrous alcohol. I then make a water solution of gum arabic selecting the proportion to give a solution of predetermined specific gravity, and for each quart of gum arabic water solution, I slowly add 10 cubic centimeters of the alcohol thymol solution, stirring continuously while the two solutions are combined. If the alcohol thymol solution is added to the gum arabic water solution without stirring, small lumps will form in the combined mixture, and the suspension of the thymol in the gum arabic solution will be imperfect. However, when the two solutions are mixed slowly with continuous stirring, I find that a colloidal suspension is formed in which the thymol or other germicidal agent has intimate contact with all portions of the gum arabic solution, and it is believed that this intimate association of the germicidal agent with the gum arabic solution accounts for the long periods of time during which the gum arabic solution is maintained in its original sweet condition. As a substitute, or partial substitute for the slow mixing and stirring of the two solutions, I may use a suitable peptizing agent to aid in the formation of the colloidal suspension.

It is customary to use gum arabic in plate etching solutions, and a gum arabic solution prepared according to my method can advantageously be used in such etching solutions. For example, I may take an etching solution made up of one ounce of gallic acid, two ounces of tannic acid, one ounce of alum, two ounces of phosphoric acid and 126 ounces of distilled water, and add to three parts of this solution one part of 14 Baumé gum solution prepared in accordance with my method, and have a very satisfactory plate etch, but unless the gum arabic solution is first treated with my process of preserving the solution, the etch will soon become unusable due to souring of the gum arabic.

The colloidal suspension of the germicidal agent in the gum arabic solution may also be advantageously used in fountain solutions for both aluminum and zinc plates. As an example, I may use a fountain solution consisting of one ounce of gallic acid, two ounces of tannic acid, one ounce of alum, three ounces of phosphoric acid and 125 ounces of distilled water, and to two parts of this solution add one part of a gum solution of chosen specific gravity in which thymol, or some other germicidal agent is held in suspension. This is then diluted by using three or four ounces to a gallon of water.

The alcohol thymol solution in the gum may be 10 cubic centimeters to each quart of gum, the alcohol thymol solution being stirred into the gum before the gum is added to the etch.

The great advantage of my method of preserving gum arabic solutions and etching solutions using gum arabic is that the user of small lithographic machines can be relieved of the onerous task of mixing chemicals every time he wants to use the machine, and instead can obtain the necessary chemicals in bottled form which will keep almost indefinitely. There is substantially no wastage of materials so that the cost of chemicals is held at a minimum.

Obviously the ingredients and proportions given in the illustrative formulas may be widely varied within the scope of the appended claims.

What I claim is:

1. An etching solution containing gum arabic admixed with a substantially water insoluble germicidal agent which has been dissolved in a solvent that has the characteristics of a solvent that is non-injurious to the greasy image of a printing plate when applied thereto.

2. An etching solution containing gum arabic admixed with a substantially water insoluble germicidal agent which has been dissolved in a solvent which is non-injurious to the greasy image of a printing plate, and an ingredient which compared with gum arabic has a relatively strong acid reaction.

3. The method of preserving aqueous gum arabic solutions used on lithographic printing plates which consists in taking a germicidal agent, forming a relatively concentrated solution thereof in a solvent which is non-injurious to the greasy image on a printing plate and then dispersing the germicidal agent in an aqueous gum arabic solution by slowly mixing the dissolved germicidal agent with the gum arabic solution while agitating the mixture.

4. The method of preserving an aqueous gum arabic solution which consists in forming a relatively concentrated solution of thymol in alcohol and then slowly mixing the dissolved thymol in the gum arabic solution while agitating the mixture.

5. An etching solution which comprises the reaction products of an aqueous solution of gum arabic, a germicidal agent colloidally dispersed in said solution, and a grease repellant acid composition forming a compound that will not affect the greasy image of a printing plate.

6. An etching solution comprising the reaction products of thymol dissolved in alcohol, a water solution of gum arabic, and an acid water solution comprising gallic, tannic and phosphoric acid, and alum.

7. A grease repellant composition for use in solutions used on lithographic plates comprising a colloidal suspension of thymol in an aqueous solution of gum arabic.

8. A grease repellant composition for use in solutions used on lithographic plates comprising a colloidal suspension of an antiseptic in an aqueous solution of a natural gum.

9. A grease repellant composition for use on lithographic plates having the properties of a composition that has been made by dissolving thymol material in an alcohol and then adding the solution to an aqueous gum arabic solution while thoroughly agitating the mixture.

10. A composition for use in solutions used on lithographic plates comprising the following in substantially the proportions given:

2 parts of an etching solution comprising
  1 part gallic acid
  2 parts tannic acid
  1 part alum
  2 to 3 parts phosphoric acid
  125 to 126 parts distilled water to which has been added one part of gum arabic solution having thymol held in suspension therein.

11. The process of producing a decay-resistant aqueous gum solution suitable for use in lithographic printing which comprises forming a colloidal suspension of a water insoluble antiseptic in an aqueous gum solution by slowly adding to said gum solution a solution of said antiseptic in a water miscible solvent.

12. The process of producing a decay-resistant aqueous gum arabic solution suitable for use in lithographic printing which comprises forming a colloidal suspension of thymol in an aqueous gum arabic solution by slowly adding to said gum arabic solution a concentrated solution of thymol dissolved in a water miscible solvent.

13. The process of preparing a decay-resistant aqueous gum arabic solution suitable for use in lithographic printing which comprises forming a colloidal suspension of thymol in an aqueous gum arabic solution by slowly adding to said gum arabic solution a concentrated solution of thymol dissolved in an alcohol.

14. The process of producing a decay-resistant gum arabic solution suitable for use in lithographic printing which comprises forming a colloidal suspension of thymol in aqueous gum solution by slowly adding to said gum solution, with stirring, a concentrated solution of thymol dissolved in a water miscible solvent.

15. A decay-resistant lithographic etching solution comprising the reaction products of a concentrated solution of a water insoluble antiseptic in a water miscible solvent, an aqueous solution of a natural gum, and an aqueous solution of acids.

16. A decay-resistant lithographic etching solution comprising the reaction products of a concentrated solution of thymol in alcohol, an aqueous gum arabic solution, and an aqueous solution of acids and salts having an acid reaction.

EDWARD F. DELL.